Dec. 27, 1966  J. J. FANNON, JR  3,294,382
HEAT TREATING APPARATUS
Original Filed Aug. 18, 1960  11 Sheets-Sheet 2

INVENTOR
John J. Fannon, Jr.

BY  Strauch, Nolan, Neale,
Nies and Bronaugh
ATTORNEYS

Dec. 27, 1966  J. J. FANNON, JR  3,294,382
HEAT TREATING APPARATUS
Original Filed Aug. 18, 1960  11 Sheets-Sheet 5

INVENTOR
John J. Fannon, Jr.

BY Strauch, Nolan, Neale,
Nies and Bronaugh
ATTORNEYS

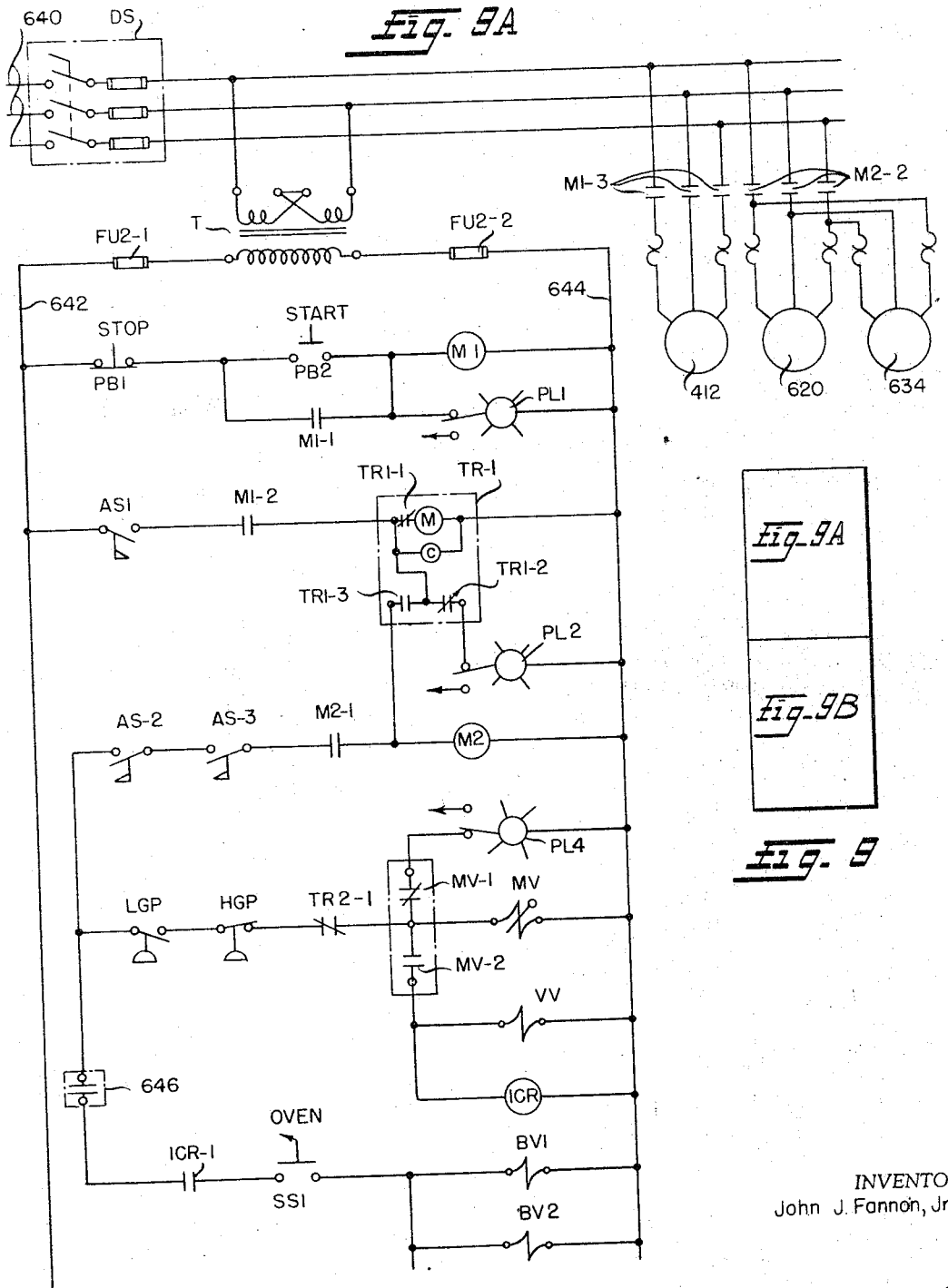

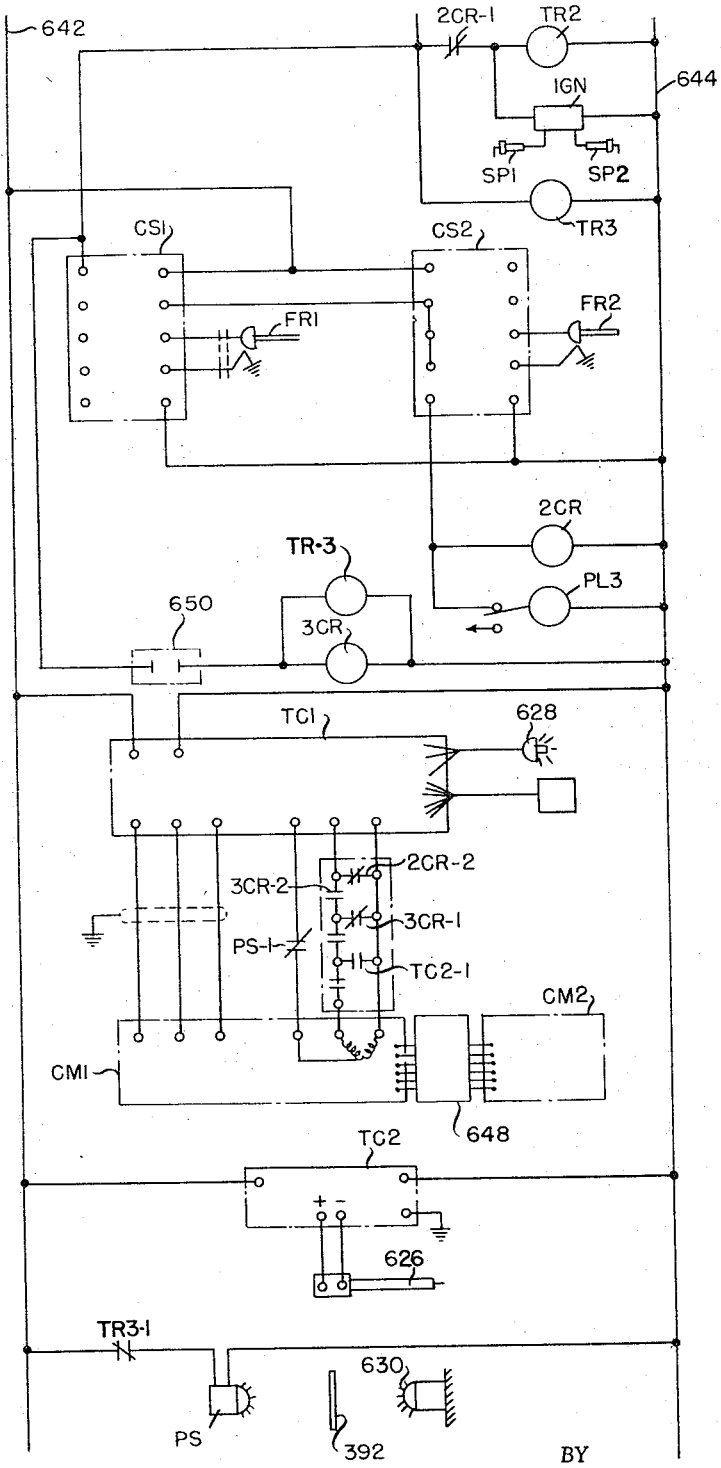

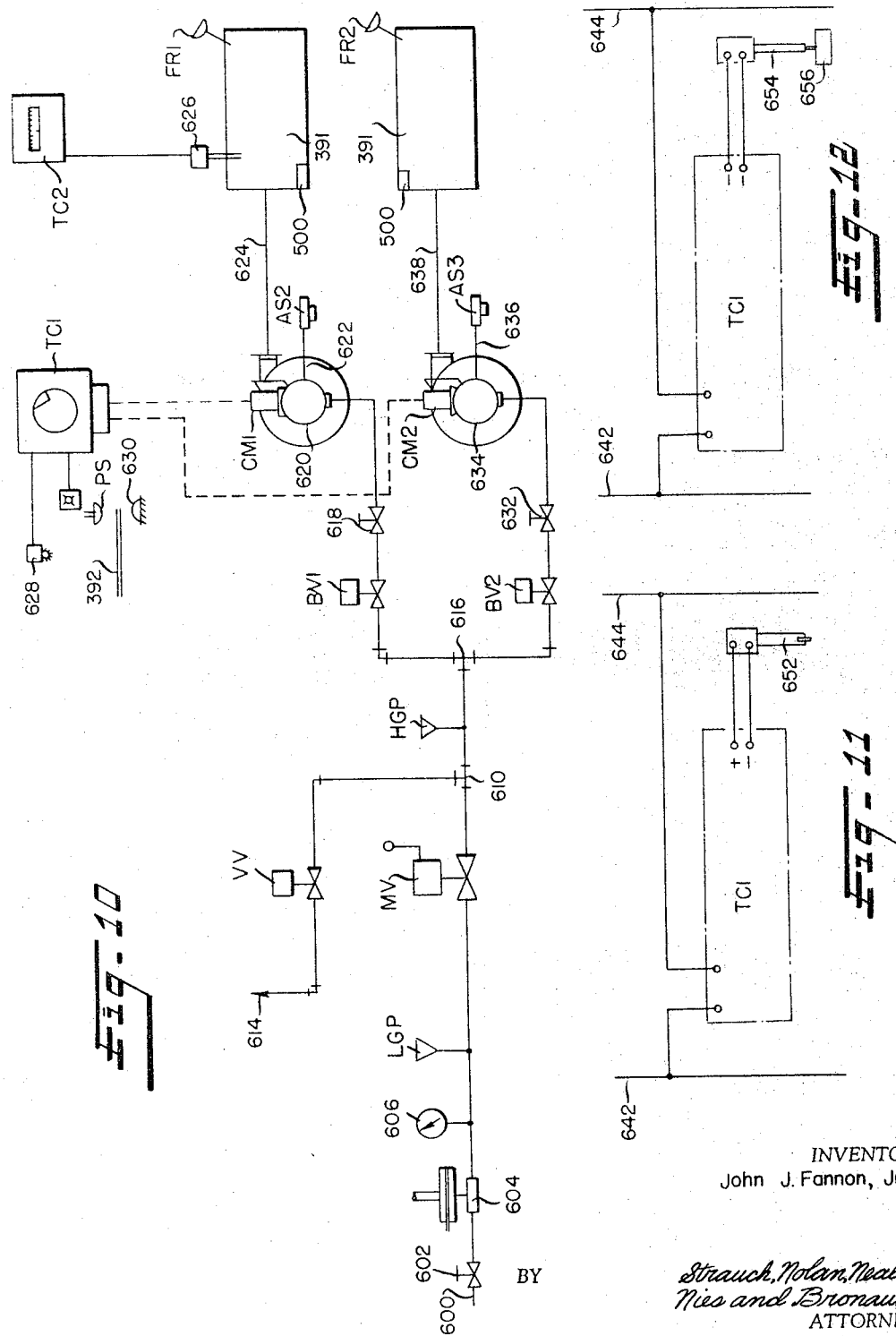

ary diagram of the control circuit for the apparatus of FIGURES 1–8;

FIGURE 10 is a diagrammatic illustration of an air-fuel mixing and control arrangement for the apparatus of FIGURES 1–8; and FIGURES 11 and 12 are fragmentary circuit diagrams of modifications of the circuit illustrated in FIGURE 9.

Referring now to the drawing, FIGURES 1–10 illustrate an industrial oven equipped with a control system constructed in accord with the principles of the present invention. As shown in FIGURE 1, which is a top plan view of the entire oven, it comprises two oven units 350 and 352 of substantially identical construction. Each oven unit is divided into two sections, and each unit is provided with an independent air supply and exhaust system. Units 350 and 352 are arranged in longitudinally aligned end-to-end relation as illustrated in FIGURE 1 to form one continuous, longitudinally elongate, open ended and otherwise enclosed oven through which work pieces are fed by a conveyor from left to right as viewed in FIGURE 1.

The air guide structure for establishing the air curtain sections of unit 352 is shown in greater detail in FIGURES 2–5 inclusive. Referring now to those figures, oven unit 352 is provided with a blower 354 mounted upon a suitable support frame 356 and driven by an electric motor 358 through a belt drive 360. Ambient air is drawn into blower 354 through an inlet port 362 and a replaceable air filter 364 and is discharged from the blower at superatmospheric pressure through a duct 366. As is most clearly shown in FIGURES 2 and 5, duct 366 opens into the longitudinal center of a duct 368 which, as shown in FIGURE 4, extends longitudinally of unit 352 at the top thereof above the oven enclosure defined by framework 369.

Duct 368 is provided with adjustable control dampers 370 and 372 adjacent each end to control the relative proportions of air flowing in opposite directions through duct 368 from its junction with duct 366. At its forward end 374, duct 368 opens into an elbow-shaped transition duct section 376 of expanding internal cross section which terminates in a downwardly facing end opening 378 connected in direct fluid communication with a downwardly extending conduit 380.

Conduit 380 terminates in an elbow section 382 forming an outlet nozzle which directs a longitudinally flowing, wide, ribbonlike air stream through the left-hand half of unit 352 as viewed in FIGURE 2. The remaining air entering duct 368 flows past control damper 372 in conduit 368 and passes into an elbow-shaped transition section 384 of similar internally expanding configuration to a transition section 376. A downwardly extending conduit section 386 similar to section 380 is connected between the downwardly facing outlet end of transition section 384 and a discharge nozzle 388 directed to the left longitudinally through the right-hand half of unit 352 (as viewed in FIGURE 2) at substantially the same level as nozzle 382.

Air flowing from blower 354 through conduit 366 into conduit 368 is split at the center of conduit 368 into two separate flow paths, one flowing to the left as viewed in FIGURE 2 and one to the right. The air stream flowing to the right flows into transition section 384 and downwardly through duct 386 and is then discharged to the left as viewed in FIGURE 2 to provide a stream of air or air curtain section for the right-hand half of unit 352.

The other stream flows to the left as viewed in FIGURES 2 and 4 into transition section 376 and downwardly through duct 380 to discharge nozzle 382 from which it flows to form an air stream flowing to the left as viewed in FIGURES 2 and 4 to form an air curtain section for

United States Patent Office 3,294,382
Patented Dec. 27, 1966

3,294,382
HEAT TREATING APPARATUS
John J. Fannon, Jr., Grosse Pointe Park, Mich., assignor to Hupp Corporation, Cleveland, Ohio, a corporation of Virginia
Original application Aug. 18, 1960, Ser. No. 50,421, now Patent No. 3,228,113, dated Jan. 11, 1966. Divided and this application Oct. 29, 1965, Ser. No. 505,639
15 Claims. (Cl. 263—6)

This application is a division of application No. 50,421, filed August 18, 1960, by John J. Fannon, Jr. for Heating Apparatus and Method (now Patent No. 3,228,113).

The invention disclosed herein relates to industrial ovens and, more particularly, to novel improved control systems for industrial ovens having burners of the gas-fired infrared type.

In general, the novel industrial ovens of the present invention include a conveyor and infrared generators so located as to heat objects carried through the oven by the conveyor. The infrared generators are preferably of the combustion type, and the oven is therefore provided with a system for supplying a combustible mixture to the infrared generators. Among the important features of the present invention is a novel control system for regulating the flow of the combustible mixture to the infrared generators. This novel system makes provision for varying the rate of supply of the combustible mixture in accord with the temperature of the objects being heated and for reducing or terminating the flow of the combustible mixture in the absence of work pieces on the conveyor. Applicant's control system also preferably makes provision for overriding the work responsive controls during the start-up of the system and under circumstances in which abnormal conditions such as overheating of the infrared generators, ignition failure, or a stoppage of the conveyor exist. Provision is also preferably made in applicant's novel control system for a high degree of flexibility so that it may be readily adapted to various types of industrial ovens.

The primary object of the present invention is the provision of industrial ovens of the type disclosed in the parent application which have novel, improved control systems.

Other important objects of the present invention and additional novel features and advantages thereof will become apparent from the appended claims and as the ensuing detailed description and discussion proceeds in conjunction with the accompanying drawing, in which:

Figure 1:
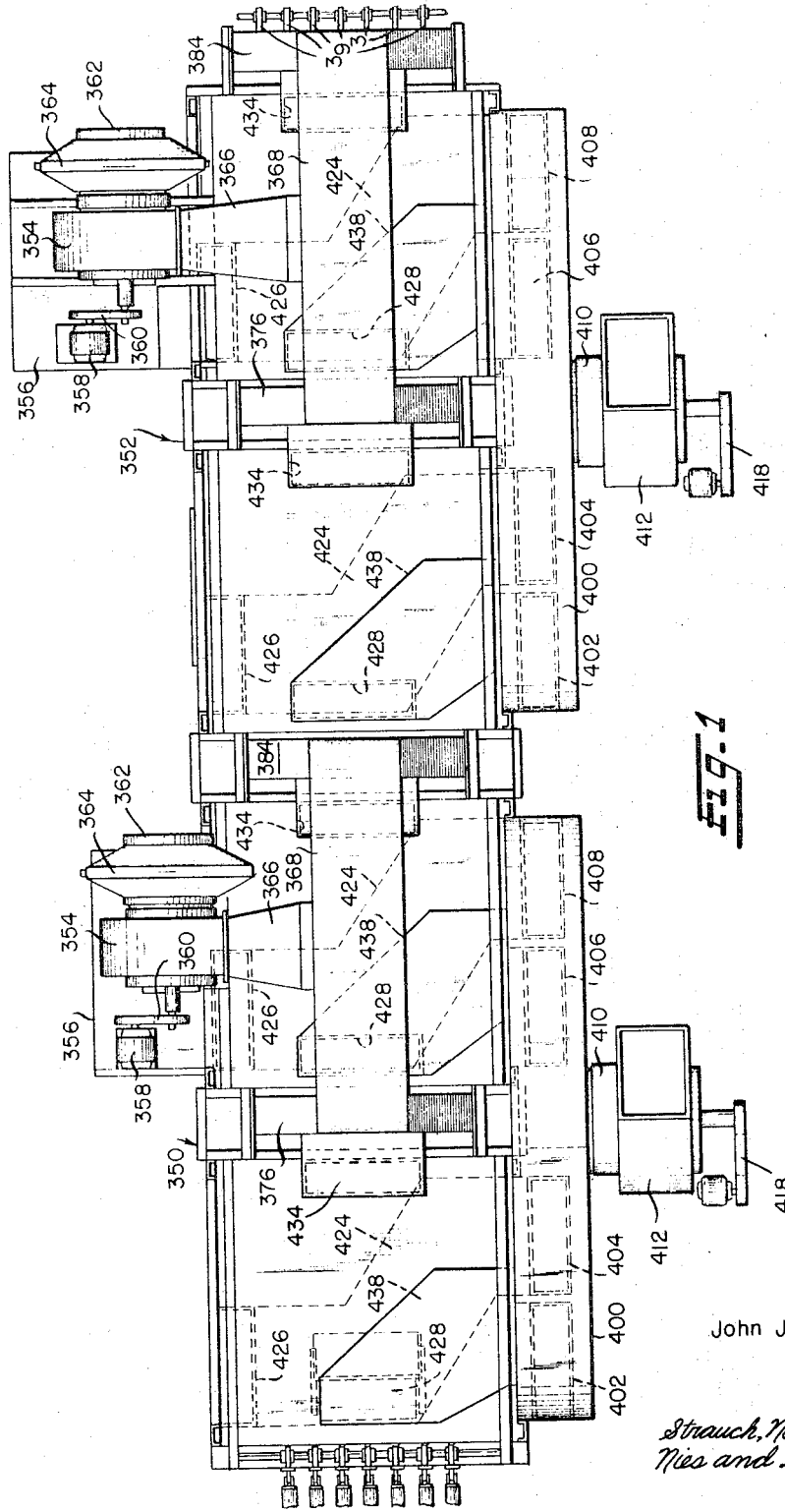
FIGURE 1 is a top plan view of heating apparatus contructed in accordance with the principles of the present invention.
Figure 2:
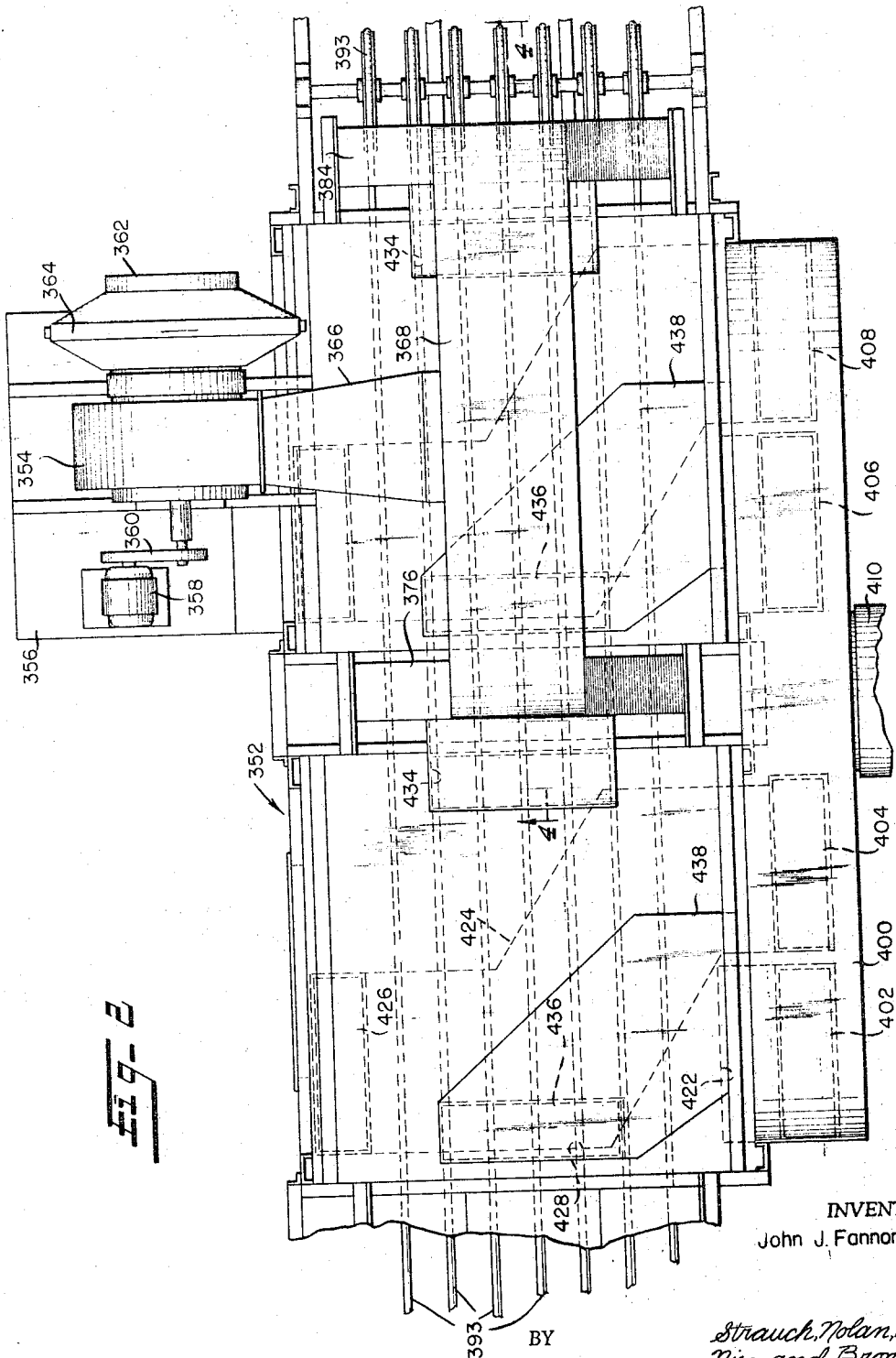
FIGURE 2 is an enlarged top plan view of the right-hand half of the apparatus illustrated in FIGURE 1.

FIGURE 9 is a diagram illustrating the relation of FIGURES 9A and 9B which together constitute a schethe left-hand half of unit 352 as viewed in FIGURE 2. Air is directed from nozzles 382 and 388 by horizontally pivoted adjustable louvers 389 and vertically pivoted adjustable louvers 390.

Figure 4:
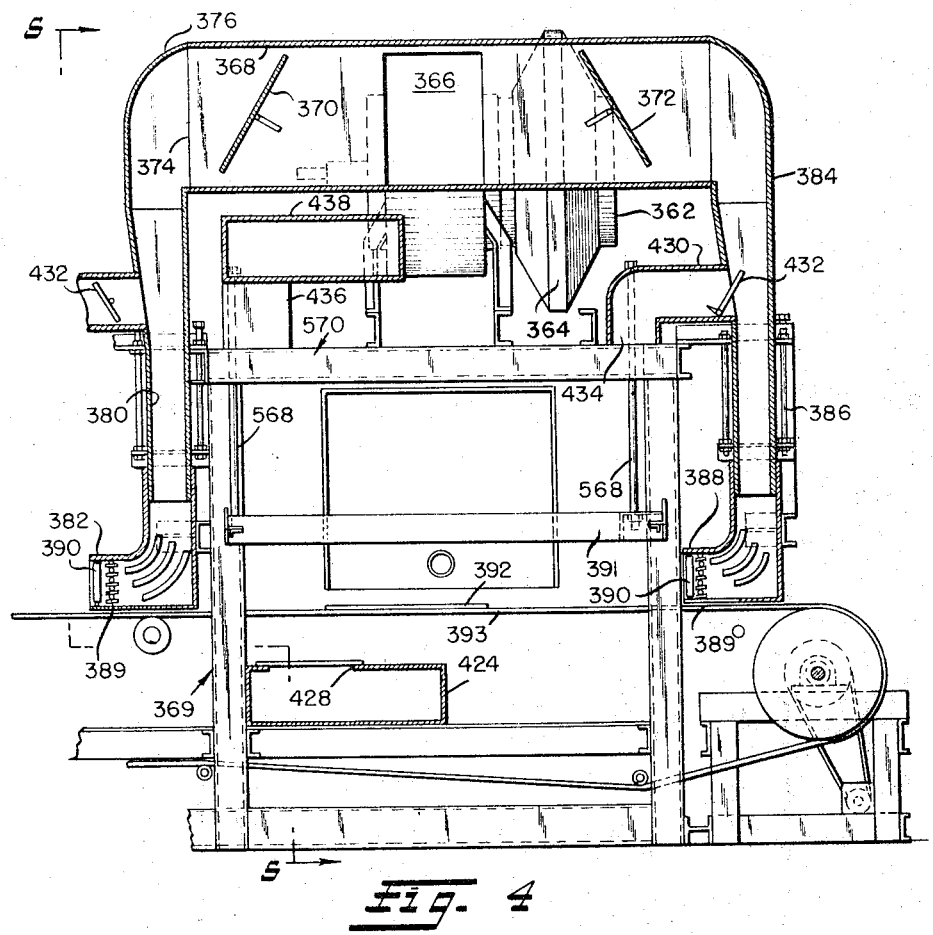
FIGURE 4 is a longitudinal center line section taken substantially along the line 4—4 of FIGURE 2.

As is apparent from FIGURES 4 and 5 and as will be described in greater detail presently in reference to FIGURES 6–9, a bank 391 of downwardly facing, gas burning infrared generators is mounted within each section of each unit of the oven. The infrared generators may be of the type disclosed in the parent application, the type disclosed in U.S. Patent No. 2,775,294 or any other type which may be desired. Each generator bank 391 consists of a plurality of longitudinally extending rows of generators with each row having a plurality of end-to-end disposed generators therein.

One bank 391 is located in front of and at a level slightly above the top of the opening of each of the nozzles 382 and 388 so that the air streams discharging from nozzles 382 and 388 are directed beneath the generator bank 391 at the left- and right-hand halves of unit 352, respectively. The level of the path of work piece movement through the oven is indicated in FIGURE 5 by a work piece 392 which moves in a path determined by the top or forward run of the work piece conveyor 393 through units 350 and 352. From this, it is apparent that the bottoms of the discharge openings of nozzles 382 and 388 are slightly above the level of the path of work piece movement through the oven as defined by the conveyor. The air exhaust conduit structure includes a conduit 400 extending longitudinally substantially along the entire length of unit 352 as is apparent from FIGURE 2. Air to be exhausted enters conduit 400 through a plurality of vertically extending ducts 402, 404, 406, and 408, which are connected in fluid communication with duct 400, extending through openings in the bottom wall of the latter.

Figure 3:
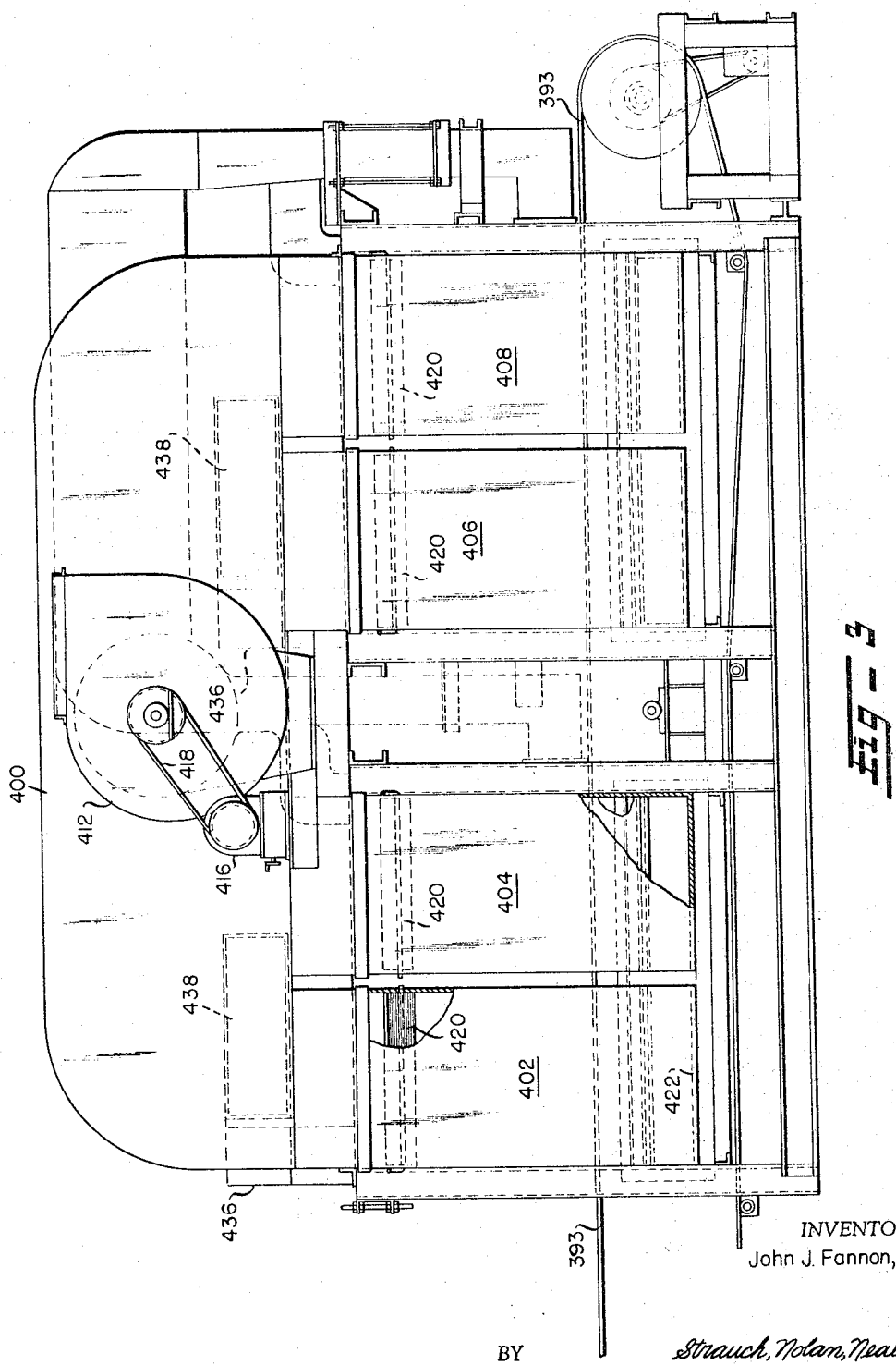
FIGURE 3 is a front elevational view, with certain portions broken away, of the portion of the apparatus of FIGURE 1, which is illustrated in FIGURE 2.

Air is exhausted from conduit 400 through a laterally extending exhaust duct 410 located substantially at the longitudinal center of duct 400 and connected to the inlet opening of a centrifugal exhaust blower 412 (FIGURE 5) mounted on a suitable support frame 414 and driven by an electric motor 416 (FIGURE 3) through a belt drive 418. As is clear from FIGURES 3 and 5, each of the vertically extending ducts 402, 404, 406, and 408 is provided with a horizontally pivoted flow control damper 420 to permit individual control of the quantity of air flow therethrough.

Figure 5:
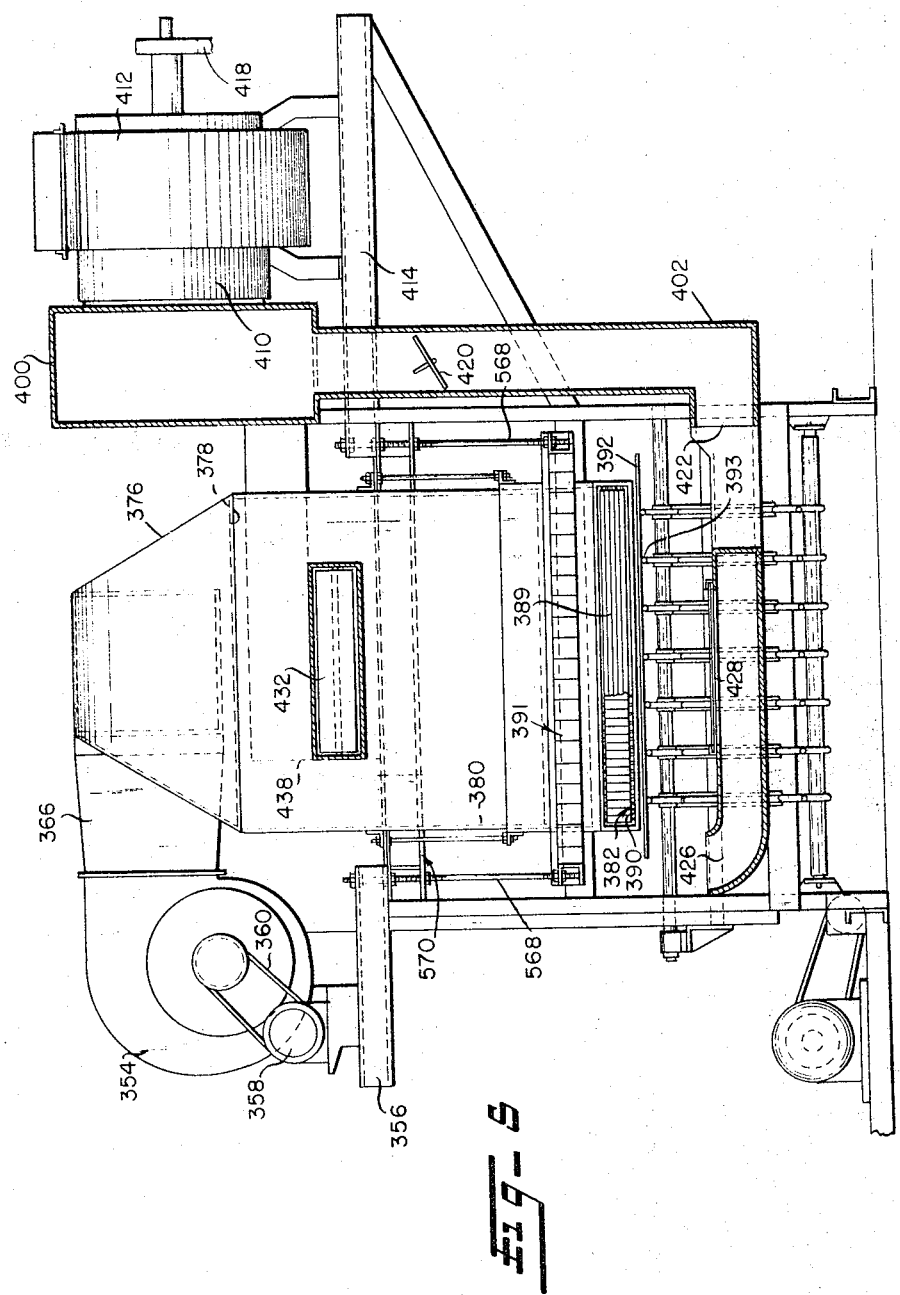
FIGURE 5 is a vertical transverse section taken substatially along the line 5—5 of FIGURE 4.

Referring now to FIGURES 2 and 5, duct 402 extends to a level beneath the path of work piece movement and is provided with an inlet opening 422 located at the end of the left-hand half of unit 352 remote from nozzle 382 (as viewed in FIGURES 3 and 4) at the right side of the path of work piece movement (as viewed in FIGURE 5). Duct 404 extends downwardly from duct 400 to the same level as duct 402 (FIGURE 3) and is connected through a conduit 424 (FIGURE 2) extending transversely and longitudinally of the path of work piece movement to an inlet opening 426 (FIGURES 2 and 5) located in lateral alignment with the inlet 422 for duct 402. Conduit 424 is also provided with an adjustable size inlet opening 428 at the center of and beneath the path of work piece movement to maintain that portion of the oven at sub-atmospheric pressure.

As is apparent by reference to FIGURE 5, air is discharged from nozzle 382 in a direction extending longitudinally of the path of and in a direction opposite to the direction of work piece movement, flowing toward the left-hand end of unit 352 as viewed in FIGURE 2. Due to the sub-atmospheric pressures at each side of the path of work piece movement at the end of unit 352 remote from discharge nozzle 382 created by the withdrawal of air through the inlet ports 422 and 426 for ducts 402 and 404, respectively, the stream discharged from nozzle 382 divides and expands laterally as it approaches the end of unit 352 remote from discharge nozzle 382 and flows down and around the side of the path of work piece movement into openings 422 and 426 without material contact with the work pieces being fed through the oven.

Since the work piece is being fed through the oven to the right as viewed in FIGURE 2 and as the air is being directed from nozzle 382 to the left as viewed in FIGURE 2, any air which might contact the work piece at the end of the left-hand half of unit 352 as it is being drawn down to openings 422 and 426 is heated by the volatilized solvent particles and infrared generator exhaust gases entering the stream as it passes from nozzle 382 toward the end of the left-hand half of unit 352 so that it does not cause undesired cooling of the work pieces being heated.

The vertically extending ducts 406 and 408 are connected to inlet openings located in the same positions at the right-hand half of unit 352 as the inlet openings 422 and 426 for ducts 402 and 404, respectively.

Referring again to FIGURE 4, a portion of the air fed into vertically extending conduit 386 is directed through a duct 430 past a control damper 432 to a discharge opening 434 to direct a sufficient amount of air against the top of the housings of the infrared generators of bank 391 to prevent their housings from overheating. This air is withdrawn through a downwardly facing inlet opening into a duct 436, which communicates with a laterally extending duct 438 extending into the side of duct 400 as is best illustrated in FIGURE 5.

The air curtain structure of unit 350 is in all material respects the same as described above in reference to unit 352 with the exception that one of the sections of the air curtain must be provided with a greater solvent evacuating capacity than that of the remaining sections. In this embodiment the left-hand section of the second unit 352 will normally have greater solvent evacuating capacity than the sections of unit 350 or the right-hand section of unit 352. This difference in capacity can normally be achieved by adjustment of dampers 370 and 372 (FIGURE 4), dampers 420 (FIGURES 3 and 5), and the adjustable size inlet opening 428. It has been found in certain installations, however, that adjustment of these openings and dampers does not provide sufficient differential in volatized solvent evacuating capacity; and in those installations it has been found necessary to provide larger inlet openings 422, 426 and 428 and larger exhaust ducts connected thereto in the oven section in which maximum solvent volatilization occurs.

Figure 6:
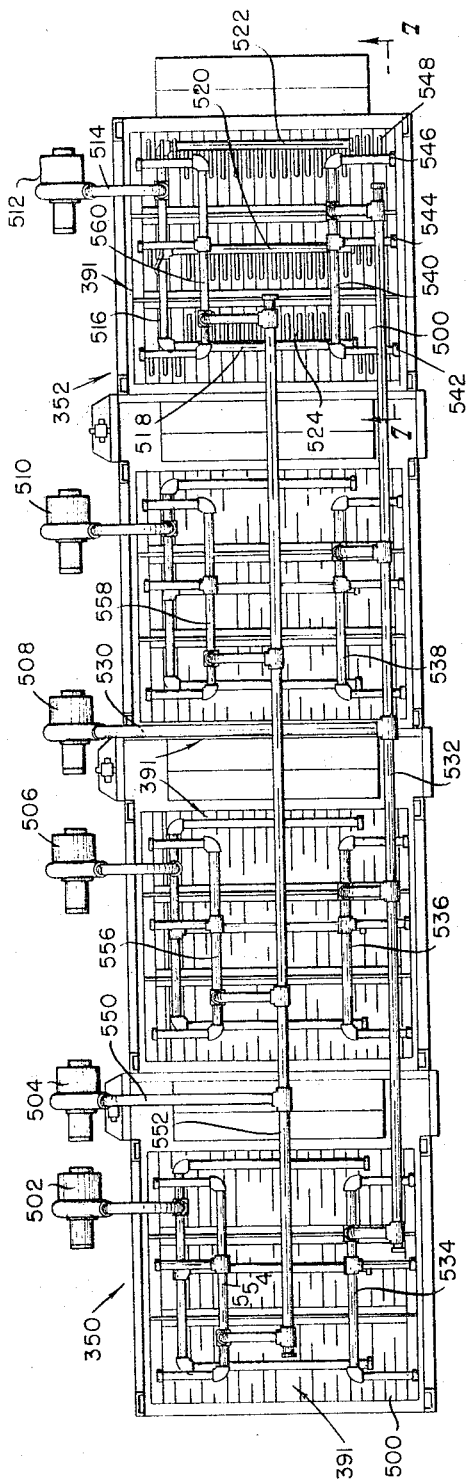
FIGURE 6 is a plan view of the apparatus of FIGURE 1 with the air duct structure removed and illustrating the conduits for supplying premixed gaseous fuel and air to the infrared generators employed in the apparatus.

The distribution for the premixed gaseous fuel and air to the banks 391 of infrared generators is illustrated in detail in FIGURES 6–9. Referring first to FIGURE 6, the two units 350 and 352 of the oven of FIGURES 1–5 are each provided with two banks of infrared generators 391. Each bank comprises twenty parallel, longitudinally extending rows of three infrared generators. Each generator 500 is longitudinally elongate in construction and arranged in end-to-end relation with the other generators in the same row. This total of two hundred forty infrared generators is divided into six zones of generators, which are individually supplied with premixed air and fuel from one of six air and gaseous fuel premixing blower units 502, 504, 506, 508, 510 and 512.

Unit 512 discharges into a conduit 514 which opens into a longitudinally extending manifold 516 which discharges into branch manifolds 518, 520 and 522 extending transversely of generator bank 391 at the right-hand end of FIGURE 6. As is most clearly illustrated in FIGURES 6 and 7, small tubular conduits 524 individually connect each of the fourteen central infrared generators 500 to branch manifold 518. The fourteen central infrared generators 500 disposed beneath branch manifold 520 are similarly individually connected to it, and the fourteen central infrared generators disposed beneath branch manifold 522 are individually connected to this branch manifold. Premixing blower unit 512 thus supplies premixed gaseos fuel and air to the central forty-two infrared generators of generator bank 391 at the right of FIGURE 6. Premixing blower units 502, 506, and 510 similarly supply premixed gaseous fuel and air to the central forty-two infrared generators of the left-hand bank 391 of unit 350, the right-hand bank of unit 350 and the left-hand bank 391 of unit 350, respectively.

Premixing blower unit 508 discharges into a conduit 530 connected to a longitudinally extending manifold 532 which extends over the major portion of the oven. Manifold 532 is connected to branch manifold 534 in the left-hand bank 391 of unit 350, to a branch manifold 536 in the right-hand bank of unit 350, to a branch manifold 538 in the left-hand bank of unit 352, and to a branch manifold 540. Branch manifold 534 feeds premixed fuel and air to the nine infrared generators in the three rows of the infrared generators adjacent the bottom of FIGURE 6 in the left-hand bank 391 of unit 350.

Branch manifolds 536, 538, and 540 similarly feed the corresponding infrared generators 500 of the portions of oven units 350 and 352 with which they are associated. For this purpose, as is clearly shown by a comparison of FIGURES 6 and 7, branch manifold 540 discharges into three distribution pipes 542, 544, and 546 to which the associated infrared generators 500 are connected by conduits 548.

Figure 7:
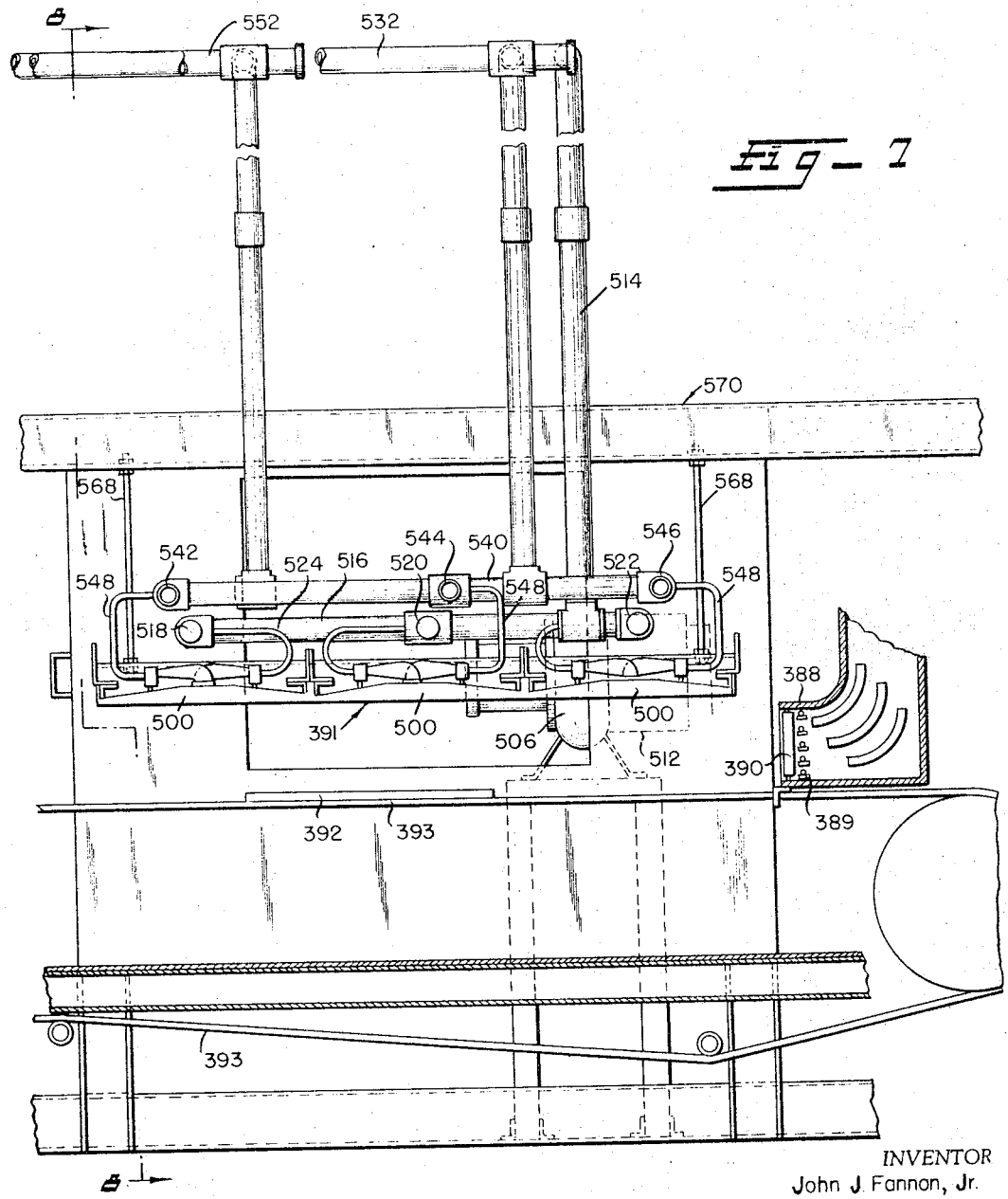
FIGURE 7 is a section taken substantially along line 7—7 of FIGURE 6.
Figure 8:
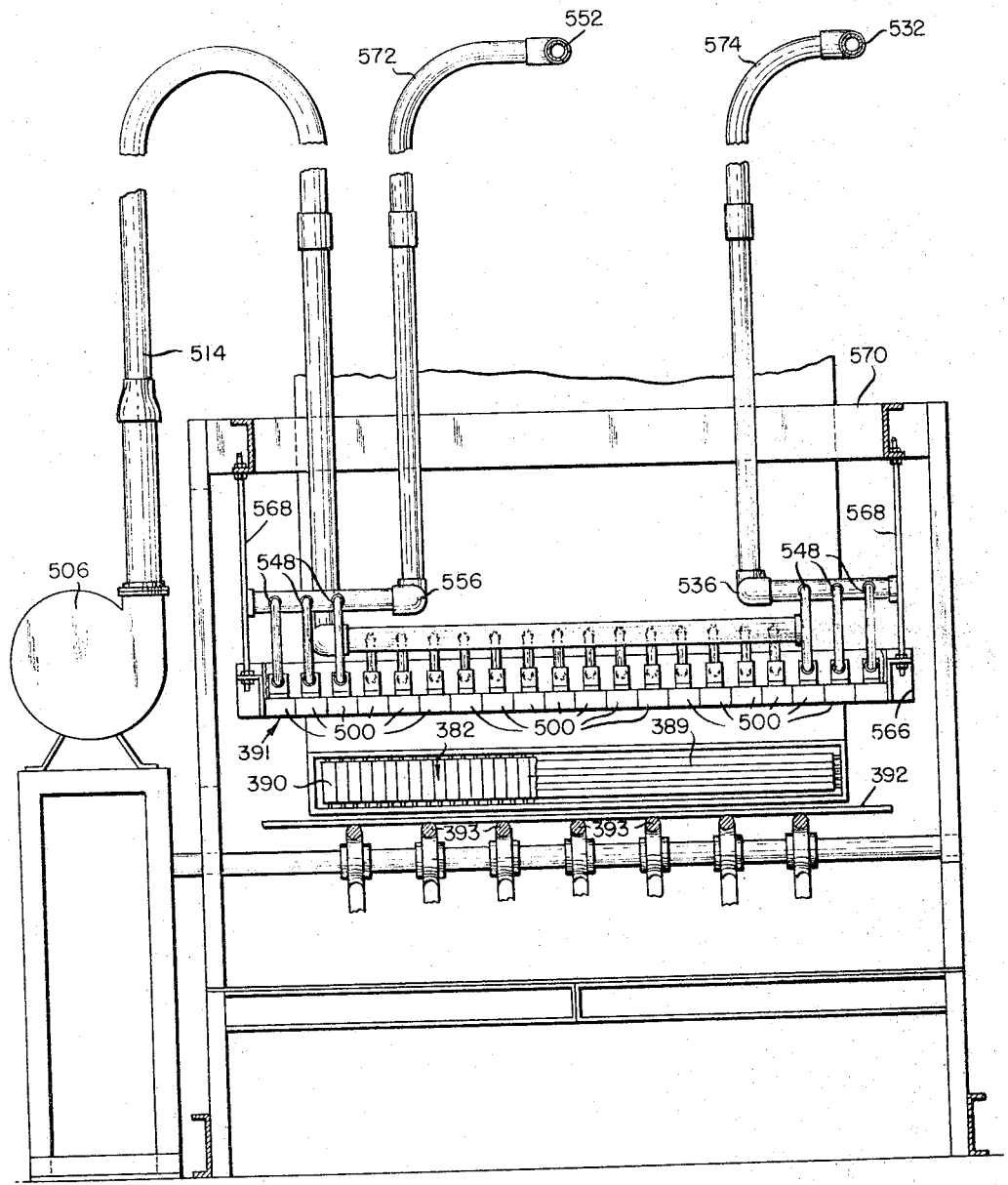
FIGURE 8 is a section taken substantially along line 8—8 of FIGURE 7.

Premixing blower unit 504 is connected through a conduit 550 to a longitudinally extending distribution manifold 552 discharging into branch manifolds 554, 556, 558, and 560 from which premixed gaseous fuel and air is directed to the nine infrared generators 500 in the three longitudinally extending rows of infrared generators adjacent the top of FIGURE 6 in substantially the same manner as described in reference to the lowermost three rows as shown in FIGURES 5, 7, and 8.

From the foregoing description, therefore, it is apparent that the thirty-six infrared generators 500 in the three lowermost rows of infrared generators 500 as viewed in FIGURE 6 are connected to the blower unit 508, that the thirty-six generators 500 in the three uppermost rows of infrared generators as viewed in FIGURE 6 are connected to blower unit 504, and that the central forty-two infrared generators 500 in the central fourteen rows of each bank 391 are connected bank-by-bank to individual blower units 502, 506, 510, and 512, respectively. Thus, separate control is provided for the outside three rows of infrared generators at each side of the oven; and individual control is provided for the central fourteen rows in each of the four banks of infrared generators throughout the oven.

As is apparent from FIGURE 8, the sixty infrared generators in each bank are mounted within a frame structure 566 which is suspended by tie bolts 568 from the main frame structure 570 of the oven. By adjustment of tie bolts 568, each frame 566 may be raised or lowered relative to the path of work piece movement. For this purpose, portions of the distribution conduits for the premixed fuel and air are made of flexible tubing 572 and 574 for the interconnections between manifold 552 and branch manifold 556 and between manifold 532 and branch manifold 536, respectively.

A diagrammatic illustration of the control system for supplying premixed fuel and air to the infrared generators 500 is illustrated in FIGURE 10. The control circuit for this system is illustrated in FIGURE 9.

Referring first to FIGURE 10, the fuel flows from a supply main 600 seriatim through a manually operated main shutoff valve 602, a gas pressure regulating valve 604, a pressure gauge 606, a low gas pressure actuated switch LGP, and a safety latch solenoid control valve MV having contacts MV–1 and MV–2, to a junction 610. Junction 610 is connected through a normally open solenoid-operated vent valve VV to an exterior vent 614. From junction 610 (when valve VV is closed the gas flows past a high gas pressure actuated switch HGP to a branch junction 616. From junction 616, the gas normally flows through a normally closed, solenoid actuated burner valve BV1, and a manually operated shutoff valve 618 to a premixing unit 620 controlled by a control motor CM1.

Air is induced from the ambient atmosphere into premixing unit 620 through a conduit 622 past an air flow indicating switch AS2. The premixed fuel and air is discharged through a conduit 624 for distribution to the center forty-two of the infrared generators 500 of one bank 391.

The temperature of the generators is detected by a thermocouple 626 electrically connected to a temperature controller TC2; and the presence or absence of flame at the infrared generators 500 is detected by a flame rod FR1.

Control motor CM1 is normally controlled by a temperature controller TC1 which is controlled by a radiamatic work piece temperature sensing unit 628 mounted above the path of work piece movement at the discharge end of the oven to detect the temperature of the work piece 392 as it leaves the oven. A photoswitch PS located above the path of work piece movement and cooperating with a light source 630 located beneath the path of work piece movement is provided to detect the presence or absence of work pieces on the conveyor.

From junction 616, gas also flows through a normally closed, solenoid actuated burner control valve BV2 and through a manually operated shutoff valve 632 to a second premixing unit 634. Air is induced into the premixing unit 634 through a conduit 636 past an air flow detecting switch AS3. Premixing unit 634 is controlled by a controller motor CM2 which is also controlled by temperature controller TC1. Premixed air and gas is discharged from premixing unit 634 into a conduit 638 for distribution to the infrared generators 500 of a second of the six zones illustrated in FIGURE 6. Conduits 624 and 638 each feed one of the six zones of infrared generators illustrated in FIGURE 6. For simplicity in illustration, only these two of the six distribution paths have been illustrated in FIGURE 10. A flame rod FR2 is provided to detect the presence or absence of flame in the second group of infrared generators fed by conduit 638.

Referring now to FIGURE 9, electrical power is supplied from suitable supply mains 640 (which in the illustrated embodiment provide 440 volt 3 phase 60 cycle current) through a disconnect switch DS and: (1) through the normally open contacts M2–2 of relay M2 to the motors of premixing units 620 and 634 (when the contacts M2–2 are closed); (2) to the motors of exhaust blowers 412 through the normally open contacts M1–3 of relay M1 when closed; and (3) to the primary winding of transformer T. The secondary winding of transformer T is connected through fuses FU2–1 and FU2–2 to the opposite sides of control circuit main leads 642 and 644.

To start the oven, start switch PB2 is manually closed. With switch PB2 closed, a circuit is established from line 642 through a normally closed stop switch PB1, through the now closed start switch PB2, and through the coil of relay M1 to main lead 644 energizing the relay. Energization of relay M1 closes hold contacts M1–1, shunting start switch PB2, which may then be released without de-energizing the circuit. Pilot light PL1 is also turned on when relay M1 is energized; and contacts M1–3 are closed. This energizes the motor of exhaust fan 412 to purge the oven of any gas or combustion products that may be in it.

When exhaust fan 412 reaches operating speed, the air flow switch AS1 in the exhaust air stream closes. Closure of switch AS1, together with the closure of relay contacts M1–2 by energization of relay M1, energizes purge timer TR1 through normally closed timer contacts TR1–1 and lights pilot light PL2 through normally closed timer contacts TR1–2.

Upon the elapse of a predetermined period of time, purge timer opens timer contacts TR1–1 and TR1–2 and closes timer contacts TR1–3, which energizes relay M2. Opening of contacts TR1–1 and TR1–2 de-energizes the timer, which then resets, and extinguishes pilot light PL2, indicating that the purge cycle has been completed.

Energization of relay M2 closes its contacts M2–2 to energize the motors of premixing units 620 and 634. When these units reach their operating speeds, the air flow switches AS2 and AS3 in their inlet conduits close. Assuming that a sufficiently high gas pressure is being exerted upon low gas pressure switch LGP to close its contacts and that the normally closed high gas pressure switch HGP connected to atmospheric pressure through valve VV is closed, switches LGP and HGP will both be closed.

With switches LGP and HGP, air flow switches AS2 and AS3, and the contacts M2–1 of relay M2 all closed, the solenoid of safety latch valve MV is energized effecting movement of valve MV to its fully open position. When valve MV reaches this position, normally open contacts MV–2 close, energize the solenoid of the normally open solenoid-operated vent valve VV to close the fluid passage between junction 610 (FIGURE 10) and outside vent 614. At the same time contacts MV–1 open; and pilot light PL4, which is lit while the latch valve is opening, goes out. This indicates that the valve has fully opened.

Referring again to FIGURE 9, relay 1CR is connected in parallel with the solenoid of vent valve VV and is energized at the same time as the latter. Assuming that the conveyor is running to close conveyor interlock contacts 646, the energization of relay 1CR and closure of its contacts 1CR–1 place the oven in condition for ignition of infrared generators 500. This is effected by closing oven off-on switch SS1.

Upon closure of switch SS1, the solenoids of normally closed burner solenoid valves BV1 and BV2 are energized to open their associated valves and permit gas to flow to premixing units 620 and 634, respectively. Ignition timer relay TR2 and ignition transformer IGN (FIGURE 9B) are connected in parallel with solenoids BV1 and BV2 as is work bypass timer relay TR3; and these control elements are therefore energized at the same time as solenoids BV1 and BV2 through the normally closed contacts 2CR–1 of solenoid 2CR, supplying an ignition spark to infrared generators 500 and starting timers TR2 and TR3 on their timing cycles. Timer TR2 is provided to terminate the ignition spark after a predetermined interval if the infrared generators fail to light by opening its normally closed contact TR2–1, which de-energizes relay 1CR, causing it to open its contacts 1CR–1. This interrupts the circuit to the ignition transformer IGN. Opening of contacts TR2–1 and 1CR–1 also: (1) de-energizes valves BV1 and BV2, shutting off the flow of gas to the premixers supplying the fuel-air mixture to infrared generators 500, which go out; (2) de-energizes and thereby opens valve VV, venting the oven and infrared generators; and (3) de-energizes and closes valve MV to prevent the gas from flowing from conduit 600 through the vent valve.

Flame safeguard relays CS1 and CS2 are connected in parallel with solenoids BV1 and BV2 and controlled by flame rods FR1 and FR2, respectively. When infrared generators 500 are ignited by the spark plugs SP1 and SP2 connected to ignition transformer IGN, flame safeguard relays CS1 and CS2 establish a series connection from line 642 through their contacts which energizes control relay 2CR and pilot light PL3, the pilot light indicating that the burners are on. The energization of relay 2CR opens its normally closed contacts 2CR–1 to de-energize: (1) ignition timer TR2, which then resets; and (2) ignition transformer IGN.

With the burners on, they are regulated by the temperature controller TC1 connected across main leads 642 and 644. Temperature control TC1 is a temperature recording controller with electric position proportional control rate and automatic reset.

Also, on energization, relay 2CR opens its normally closed contacts 2CR–2 to permit proportional control motors CM1 and CM2 of the temperature controller, which are controlled in parallel through balancing relays 648, to move from their start-up range in which they provide a relatively rich starting mixture to the burners to their operating range to supply a normal leaner operating mixture to the burners.

In operation, radiamatic unit 628 sights the work piece 392 as it passes from the discharge end of the oven and positions the control motors CM1 and CM2 to maintain the desired work piece temperature by controlling the firing rate. The photoswitch PS detects the presence of work. If no work pieces are being processed, photoswitch PS, by the opening of its normally closed contact PS–1, freezes the control motors CM1 and CM2 in the last operating temperature condition. If the conveyor stops, the infrared generators are shut off by the opening of conveyor interlock switch 646, which interrupts the circuits to burner valves BV1 and BV2. The valves therefore close, cutting off the flow of fuel to the premixers, causing the burners to go out.

Normally, no work will be moving through the oven until the start-up sequence just described is completed.

Photoswitch PS is prevented from opening its contact during this period and freezing the control motors CM1 and CM2 in their rich starting mixture settings after the burners of infrared generators 500 have ignited, by the work bypass timer TR3 mentioned previously, which has a normally open contact TR3–1 connected in series with the photoswitch. This open contact prevents the photoswitch from operating during the terminal portion of the start-up sequence in which the burners are ignited. When timer TR3 completes its timing cycle, it closes its contact TR3–1, transferring control of control motors CM1 and CM2 to the photoswitch as described above.

Timer TR3 is connected in parallel with fuel supply valves BV1 and BV2. Consequently, should an abnormal condition be present before timer TR3 completes its timing cycle, the timer will be de-energized at the same time as valves BV1 and BV2; and the timer will reset so that it will have a full timing cycle when the burners are reignited.

As shown in FIGURES 9A and 9B, timer TR3 can be connected in series with oven switch SS1 and a conveyor interlock switch 650 (switch 646 is deleted in this alternate arrangement) to main lead 644 instead of being wired in parallel with timer TR2 and ignition transformer IGN. In this alternate arrangement a relay CR3 is connected in parallel with the timer. Timer TR3 functions in this arrangement in the same manner as was previously described. As shown in FIGURE 9B, relay 3CR is energized as long as the conveyor is running and no other abnormal operating condition occurs to shut down the apparatus because interlock switch 650 is closed. If the conveyor stops, switch 650 opens; and relay 3CR de-energizes. This opens relay contact 3CR–1 (FIGURE 9A) and closes relay contact 3CR–2, which causes control motors CM1 and CM2 to automatically run to a low fire setting. When the conveyor starts up again to close switch S650, relay 3CR is again energized, opening contact 3CR–2 and closing contact 3CR–1 to cause control motors CM–1 and CM–2 to return to their high fire settings.

Temperature controller TC2 senses the temperatures of the infrared generators; and, if their temperature is above their maximum operating temperature, temperature controller TC2 overrides temperature controller TC1 and runs the control motors CM1 and CM2 a lower setting to maintain the maximum infrared generator temperature (typically on the order of 1600° F.) or the setting of the controller TC1, whichever is the lower.

FIGURE 11 illustrates a modification of the circuit of FIGURE 9 in which a sliding contact thermocouple 652 is utilized in place of radiamatic unit 628 to detect the temperature of the work pieces.

FIGURE 12 illustrates a further modification of the circuit of FIGURE 9 in which a thermocouple 654 senses the temperature of a target 656 inside the oven. A predetermined relationship is established by trial between the work piece temperature and the target temperature. In this type of system all factors must be kept constant. If the conveyor speed or work load is changed, for example, a new relationship between the temperature of target 656 and the work piece temperature must be determined.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Heat treating apparatus, comprising:
   (a) a conveyor having a work piece supporting surface;
   (b) infrared generators located above the conveyor with surfaces emitting visible radiation facing the work piece supporting surface of the conveyor and extending over substantially its entire width to provide a beam of radiation spanning the conveyor surface;
   (c) means for supplying a combustible mixture to said infrared generators;
   (d) means for directing a curtain of air between said infrared generators and work pieces on said conveyor substantially without impinging on and thereby reducing the temperature of the radiation emitting surfaces of said infrared generators, said last-named means including air supply means at one side of said beam and exhaust blower means, said exhaust blower means having greater capacity than said air supply means and being located at the side of the beam opposite the air supply means;
   (e) means for supplying a combustible mixture of premixed gaseous fuel and air to said generators; and
   (f) means for maintaining such supply only so long as said generators are ignited and at a rate normally determined by the temperature and presence of an object subjected to irradiation by said generators.

2. The combination of claim 1, together with means responsive to the temperature of said generators for limiting the rate of mixture supply thereto to maintain the temperature of said generators below a predetermined maximum.

3. Th combination defined in claim 1, wherein said supply means comprises a variable speed air-fuel premixing unit.

4. The combination defined in claim 2, wherein said temperature responsive means comprises a temperature sensing device disposed to detect the temperature of an object subjected to irradiation by said generators.

5. The combination defined in claim 4, wherein said temperature sensing device includes means for sensing the temperature of a work piece at the discharge end of said conveyor.

6. The combination defined in claim 5, wherein said last-named means embodies a radiant energy responsive unit.

7. The combination defined in claim 5, wherein said last-named means embodies a thermally responsive element adapted to directly sense the temperature of successive work pieces.

8. The combination defined in claim 4, wherein said object is a pre-selected target disposed adjacent said conveyor and having a predetermined thermal relation to the desired thermal characteristics of a work piece at the discharge end of said conveyor.

9. The combination as defined in claim 2, wherein said temperature responsive means includes a first temperature sensitive device disposed to detect the temperature of an object subjected to irradiation by said oven, a second temperature sensitive device disposed to detect the temperature of said oven, and means controlled by said second temperature sensitive device for limiting the maximum rate of operation of said supply means irrespective of the temperature detected by said first temperature sensitive device.

10. The combination defined in claim 1 wherein:
   (a) there are a plurality of combustion type infrared generators in said enclosure, said infrared generators being disposed in a plurality of zones; and
   (b) said combustible mixture supplying means includes means for regulating the flow of said mixture to the generators in at least one of said zones independently of the flow of the mixture to the infrared generators in the remainder of said zones.

11. In a gas-fired infrared generator equipped oven:
   (a) infrared generator gas burning apparatus within said oven disposed to irradiate a work piece in said oven;
   (b) a source of gaseous fuel;
   (c) a motor-operated premixing unit for intermixing gaseous fuel from said source with sufficient atmospheric air to effect combustion of the fuel, said premixing unit having an outlet connected to said apparatus, a first inlet connected to atmosphere and a second inlet adapted for connection to said source;
   (d) first selectively actuated means for initiating operation of the motor of said premixing unit to transmit air from said first inlet to said apparatus to purge said apparatus of residual gaseous fuel;
   (e) first and second serially arranged means for connecting said second inlet to said source;
   (f) time delay means operative in response to initiation of operation of said premixing unit to actuate said first connecting means upon the elapse of a predetermined period of time after the initiation of operation of said premixing unit;
   (g) an igniter associated with said apparatus;
   (h) a second selectively actuated means for simultaneously actuating said igniter and said second connecting means to connect said source to said premixing unit through said first and second connecting means to thereby direct intermixed gaseous fuel and air to said apparatus for ignition by said igniter;
   (i) flame detector means associated with said apparatus;
   (j) means controlled by said flame detector means for maintaining the operation of said second connecting means only if said flame detecting means detects the presence of flame at said apparatus;
   (k) a first control means responsive to the temperature of an object irradiated by said apparatus for controlling the rate of operation of said premixing unit; and
   (l) a second control means responsive to the temperature of said apparatus to override the control by said first control means in the event that and so long as said apparatus temperature exceeds a predetermined maximum.

12. Industrial heating apparatus, comprising:
   (a) means defining an enclosure;
   (b) combustion type infrared generator means in said enclosure;
   (c) means for supplying a fuel-air mixture to said generator means;
   (d) means for igniting said fuel-air mixture;
   (e) conveyor means for moving work pieces to be heated through said enclosure past said infrared generator means; and
   (f) control means operatively connected to the fuel-air mixture supplying means and including means for detecting the presence and absence of work pieces on said conveyor for regulating the flow of the fuel-air mixture to said infrared generator means, said control means further including timer means for delaying the operation of said work piece responsive control means for a predetermined period following the activation of said fuel-air mixture supplying means, whereby the fuel-air mixture will be supplied to said generator means for the duration of said period even though there are no work pieces on said conveyor.

13. Industrial heating apparatus, comprising:
(a) means defining an enclosure;
(b) combustion type infrared generator means in said enclosure;
(c) means for supplying a fuel-air mixture to said generator means;
(d) means for igniting said fuel-air mixture;
(e) conveyor means for moving work pieces to be heated through said enclosure past said infrared generator means; and
(f) control means operatively connected to the fuel-air mixture supplying means and including means for detecting the presence and absence of work pieces on said conveyor for regulating the flow of the fuel-air mixture to said infrared generator means and means responsive to the stoppage of said conveyor means for cycling said fuel-air mixture supplying means from a high-fire to a low-fire setting and to the subsequent restarting of said conveyor means for restoring said fuel-air mixture supplying means to the high-fire setting.

14. Industrial heating apparatus, comprising:
(a) means defining an enclosure;
(b) combustion type infrared generator means in said enclosure;
(c) means for supplying a fuel-air mixture to said generator means including a fuel-air premixer and means including an electrically actuated valve for supplying fuel to said premixer;
(d) means for igniting said fuel-air mixture;
(e) conveyor means for moving work pieces to be heated through said enclosure past said infrared generator means; and
(f) control means operatively connected to the fuel-air mixture supplying means and including means for detecting the presence and absence of work pieces on said conveyor for regulating the flow of the fuel-air mixture to said infrared generator means and a conveyor-actuated switch electrically connected to said valve for cutting off the flow of the combustible mixture to the infrared generator means when the conveyor stops by interrupting the circuit to and thereby deactuating said valve to interrupt the flow of fuel through said valve.

15. In a gas fired infrared generator equipped oven:
(a) gas burning infrared generator apparatus within said oven disposed to irradiate a work piece in said oven;
(b) a source of gaseous fuel;
(c) a motor-operated premixing unit for intermixing gaseous fuel from said source with sufficient atmospheric air to effect combustion of the fuel;
(d) first selectively actuated means for initiating operation of the motor of said premixing unit to transmit only air to said apparatus to purge said apparatus of residual gaseous fuel;
(e) first and second means for connecting said premixing unit to said fuel source;
(f) time delay means operative in response to initiation of operation of said premixing unit to actuate said first connecting means upon the elapse of a predetermined period of time after the initiation of operation of said premixing unit;
(g) an igniter associated with said apparatus;
(h) a second selectively actuated means for simultaneously actuating said igniter and said second connecting means to connect said source to said premixing unit through said first and second connecting means to thereby direct intermixed gaseous fuel and air to said apparatus for ignition by said igniter;
(i) means for maintaining the operation of said second connecting means only during the presence of flame at said apparatus;
(j) a first control means responsive to the temperature of an object irradiated by said apparatus for controlling the rate of operation of said premixing unit; and
(k) a second control means responsive to the temperature of said apparatus to override said first control means in the event that and so long as said apparatus temperature exceeds a predetermined maximum.

References Cited by the Examiner
UNITED STATES PATENTS

| | | | |
|---|---|---|---|
| 2,205,182 | 6/1940 | Whitten | 236—15 X |
| 2,266,392 | 12/1941 | Durant et al. | |
| 2,269,595 | 1/1942 | Miller | 236—6 X |
| 2,335,471 | 11/1943 | Ashcraft | 158—42.2 |
| 2,491,828 | 12/1949 | Otis | 263—3 X |
| 2,506,760 | 5/1950 | Albright | 236—46 |
| 2,664,283 | 12/1953 | Hess et al. | 236—15 X |
| 2,748,845 | 6/1956 | Marshall et al. | 158—28 |

FREDERICK L. MATTESON, JR., *Primary Examiner.*

D. A. TAMBURRO, *Assistant Examiner.*